United States Patent
Nagasawa et al.

(10) Patent No.: US 9,914,391 B2
(45) Date of Patent: Mar. 13, 2018

(54) VEHICLE PROXIMITY NOTIFICATION APPARATUS

(71) Applicant: Panasonic Intellectual Property Management Co., Ltd., Osaka (JP)

(72) Inventors: Shinnosuke Nagasawa, Osaka (JP); Fumiyasu Konno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/591,282

(22) Filed: May 10, 2017

(65) Prior Publication Data

US 2017/0240108 A1    Aug. 24, 2017

Related U.S. Application Data

(63) Continuation of application No. PCT/JP2016/004877, filed on Nov. 15, 2016.

(30) Foreign Application Priority Data

Nov. 19, 2015   (JP) .................................. 2015-226773

(51) Int. Cl.
  *H04R 3/00* (2006.01)
  *B60Q 5/00* (2006.01)
  (Continued)

(52) U.S. Cl.
  CPC ............. *B60Q 5/008* (2013.01); *H04R 3/005* (2013.01); *H04R 3/12* (2013.01); *H04R 29/00* (2013.01);
  (Continued)

(58) Field of Classification Search
  CPC . H04Q 5/80; H04Q 5/008; H04R 3/00; H04R 29/00; H04R 3/12
  (Continued)

(56) References Cited

U.S. PATENT DOCUMENTS

2012/0146780 A1*  6/2012  Tsuzuki ................. B60Q 5/008
                                                                340/435

FOREIGN PATENT DOCUMENTS

JP       2012-240503       12/2012

OTHER PUBLICATIONS

International Search Report of PCT application No. PCT/JP2016/004877 dated Feb. 14, 2017.

* cited by examiner

*Primary Examiner* — Melur Ramakrishnaiah
(74) *Attorney, Agent, or Firm* — Greenblum & Bernstein, P.L.C.

(57) ABSTRACT

A vehicle proximity notification apparatus has first and second loudspeakers which output warning sound notifying proximity of a vehicle to an outside, and an adjusting unit. The adjusting unit adjusts the sound output from the first loudspeaker so that a sound collecting signal, which is obtained when the second loudspeaker collects the sound output from the first loudspeaker, coincides with a reference signal, in a state in which the first loudspeaker functions as a sound outputting element and the second loudspeaker functions as a sound collecting element. In addition, the adjusting unit adjusts the sound output from the second loudspeaker so that a sound collecting signal, which is obtained when the first loudspeaker collects the sound output from the second loudspeaker, coincides with a reference signal, in a state in which the second loudspeaker functions as a sound outputting element and the first loudspeaker functions as the sound collecting element.

5 Claims, 8 Drawing Sheets (51) Int. Cl.
 *H04R 3/12* (2006.01)
 *H04R 29/00* (2006.01)
(52) U.S. Cl.
 CPC ....... *B60Y 2306/11* (2013.01); *H04R 2400/01* (2013.01); *H04R 2499/13* (2013.01)
(58) Field of Classification Search
 USPC ......... 381/56, 86, 120; 340/435, 384.1, 463, 340/471, 901
 See application file for complete search history.

FIG. 1

| Center Freq.[Hz] | Min. SPL [dB(A)] | | | | |
|---|---|---|---|---|---|
| | At the time of stopping | Backing | 10 km/h | 20 km/h | 30 km/h |
| 315 | 42 | 45 | 48 | 54 | 59 |
| 400 | 43 | 46 | 49 | 55 | 59 |
| 500 | 43 | 46 | 49 | 56 | 60 |
| 2000 | 42 | 45 | 48 | 54 | 58 |
| 2500 | 39 | 42 | 45 | 51 | 56 |
| 3150 | 37 | 40 | 43 | 49 | 53 |
| 4000 | 34 | 36 | 39 | 46 | 50 |
| 5000 | 31 | 34 | 37 | 43 | 48 |

VEHICLE PROXIMITY NOTIFICATION APPARATUS

BACKGROUND

1. Technical Field

The present disclosure relates to a vehicle proximity notification apparatus which is placed in a vehicle and outputs warning sound notifying proximity of the vehicle to an outside.

2. Description of the Related Art

Since electric vehicles and hybrid vehicles generate low noise, there is a problem in that pedestrians and the like does not easily notice proximity of a vehicle at the time of low-speed traveling of the vehicle in which the vehicle itself has low road noise. Therefore, in low noise vehicles such as electric vehicles and hybrid vehicles, a vehicle approach notification apparatus is provided which warns the pedestrians and the like about the proximity of the vehicle by generating warning sound, which is continuous sound for reminding a travelling state of the vehicle at the time of traveling (for example, refer to Japanese Patent Unexamined Publication No. 2012-240503).

SUMMARY

Cost reduction is desired in such a vehicle approach notification apparatus.

Here, an object of this disclosure is to provide a vehicle proximity notification apparatus capable of realizing cost reduction.

The vehicle proximity notification apparatus according to an aspect of the disclosure is a vehicle proximity notification apparatus being placed in a vehicle, and is configured as follows. That is, the vehicle proximity notification apparatus has a first loudspeaker and a second loudspeaker that output warning sound notifying proximity of the vehicle to an outside, a first switch that switches the first loudspeaker to function as a sound outputting element converting an electric signal to sound, or to function as a sound collecting element converting sound to an electric signal, and a second switch that switches the second loudspeaker to function as a sound outputting element or to function as a sound collecting element. Also, the vehicle proximity notification apparatus further has an adjusting unit that (1) adjusts the sound output from the first loudspeaker so that a first sound collecting signal, which is obtained when the second loudspeaker collects the sound output from the first loudspeaker, coincides with a first reference signal, in a state in which the first loudspeaker functions as the sound outputting element and the second loudspeaker functions as the sound collecting element. Further, the adjusting unit (2) adjusts the sound output from the second loudspeaker so that a second sound collecting signal, which is obtained when the first loudspeaker collects the sound output from the second loudspeaker, coincides with a second reference signal, in a state in which the second loudspeaker functions as the sound outputting element and the first loudspeaker functions as the sound collecting element.

Moreover, generic or specific aspects of these components may be realized by a system, a method, an integrated circuit, a computer program, a recording medium such as a CD-ROM readable by a computer, or the like, and may be realized by an arbitrary combination of the system, the method, the integrated circuit, the computer program, and the recording medium.

The disclosure is capable of providing the vehicle proximity notification apparatus capable of realizing cost reduction.

DETAILED DESCRIPTION OF PREFERRED EMBODIMENTS (Knowledge for Base of Disclosure)

In a vehicle approach notification apparatus, there is a concern that warning sound is changed due to change of sound circumference around a loudspeaker, change of a circumference inside of the vehicle, deterioration thereof as elapsing time, and the like.

Warning capability to a pedestrian or the like are deteriorated because of such a change of the warning sound. Therefore, the warning capability of the warning sound is required to be maintained by adjusting the sound pressure of the warning sound according to the change of the warning sound.

To address the situation, the vehicle proximity notification apparatus disclosed in PTL 1 has a loudspeaker which generates warding sound for warning proximity of the vehicle to the pedestrian or the like, and a microphone which detects the warning sound. The vehicle proximity notification apparatus compares a detected value of the warning sound detected by the microphone with a reference value, and adjusts an output to the loudspeaker so that the sound pressure of the warning sound generated from the loudspeaker to the reference value, based on a compared result. Accordingly, the vehicle proximity notification apparatus can suppress the change of the warning sound.

However, in a technique disclosed in PTL 1, there is a problem in that costs are increased because the microphone needs to be separately provided.

Figure 1:
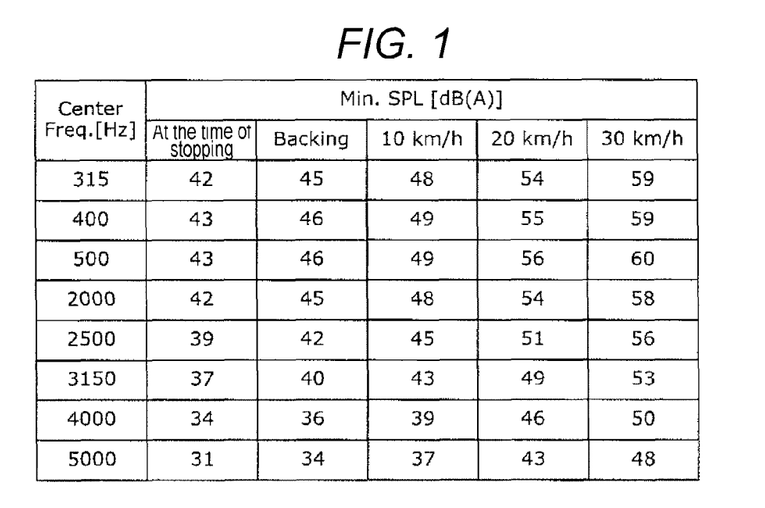
FIG. 1 is a table illustrating a regulation example of a minimum sound pressure value of warning sound.

Meanwhile, regarding the warning sound output from low noise vehicles such as electric vehicle and hybrid vehicles, regulations of minimum sound pressure value are considered in National Highway Traffic Safety Administration (NHTSA) in North America. For example, as illustrated in FIG. 1, the minimum sound pressure value is regulated with respect to eight frequency bands of ⅓ octave.

Figure 2:
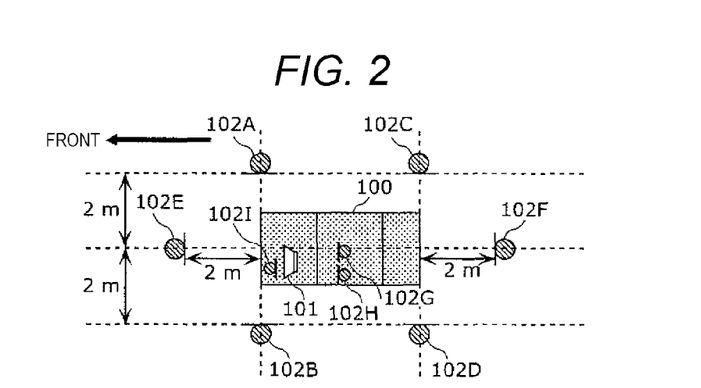
FIG. 2 is a diagram illustrating a regulation example of a measurement condition of the warning sound.
Figure 3:
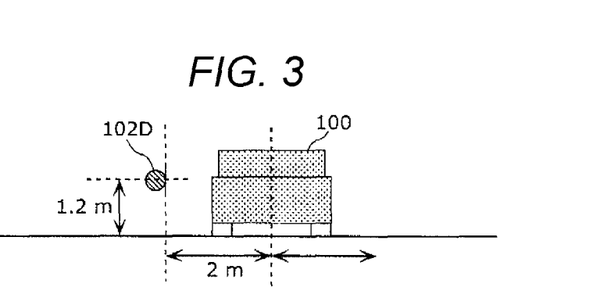
FIG. 3 is another diagram illustrating the regulation example of the measurement condition of the warning sound.

In addition, the measurement conditions are regulated as illustrated in FIGS. 2 and 3. As illustrated in FIG. 2 and FIG. 3, the warning sound is generated by loudspeaker 101 provided to vehicle 100. In addition, the warning sound is measured by microphones 102A to 102I. Specifically, microphones 102A and 102B are provided on a bumper line at a front of vehicle 100, are disposed on right and left 2 m from the center of vehicle 100, respectively, and at a position of 1.2 m from the ground. Microphones 102C and 102D are provided on a bumper line at a rear of vehicle 100, are disposed on right and left 2 m from the center of vehicle 100, respectively, and at a position 1.2 m from the ground. Microphones 102E and 102F are disposed on a center line of vehicle 100, at a position 2 m from the bumper line at the front and rear of vehicle 100, respectively, and at a position 1.2 m from the ground. Microphones 102G and 102H are disposed at both ear positions of a left front seat inside vehicle 100, respectively. Microphone 102I is disposed near (approximately 2 cm) loudspeaker 101.

As described above, the vehicle approach notification apparatus is required to output the warning sound of the minimum sound pressure value or more in all direction around vehicle 100. In order to satisfy such a regulation, a plurality of loudspeakers is necessary to be used rather than a single loudspeaker.

In the exemplary embodiment to be described later, regarding the vehicle approach notification apparatus using the plurality of loudspeakers, a vehicle proximity notification apparatus which is capable of realizing cost reduction will be described.

The vehicle proximity notification apparatus according to an aspect of the disclosure is placed in a vehicle, and is configured as follows.

That is, the vehicle proximity notification apparatus has a first loudspeaker and a second loudspeaker which output the warning sound notifying proximity of a vehicle to an outside, a first switch which switches the first loudspeaker to function as a sound outputting element converting an electric signal to sound or to function as a sound collecting element converting sound to an electric signal, and a second switch which switches the second loudspeaker to function as a sound outputting element or to function as a sound collecting element. The apparatus further has an adjusting unit (1) adjusts the sound output from the first loudspeaker so that a first sound collecting signal, which is obtained when the second loudspeaker collects the sound output from the first loudspeaker, coincides with a first reference signal, in a state in which the first loudspeaker functions as the sound outputting element and the second loudspeaker functions as the sound collecting element. Further, the adjusting unit (2) adjusts the sound output from the second loudspeaker so that a second sound collecting signal, which is obtained when the first loudspeaker collects the sound output from the second loudspeaker coincides with a second reference signal, in a state in which the second loudspeaker functions as the sound outputting element and the first loudspeaker functions as the sound collecting element.

As seen from the above, a separate microphone is not needed because the loudspeakers are also used as microphones. Accordingly, the vehicle proximity notification apparatus is capable of realizing cost reduction.

For example, the adjusting unit may have a first comparator which compares the sound pressure of the first sound collecting signal with the first reference sound pressure indicated by the first reference signal, and a first sound pressure adjusting unit which adjusts the sound pressure of the sound output from the first loudspeaker so that the sound pressure of the first sound collecting signal coincides with the first reference sound pressure, based on a compared result by the first comparator. In addition, the adjusting unit may also have a second comparator which compares the sound pressure of the second sound collecting signal with a second reference sound pressure indicated by the second reference signal, and a second sound pressure adjusting unit which adjusts the sound pressure of the sound output from the second loudspeaker so that the sound pressure of the second sound collecting signal coincides with the second reference sound pressure, based on a compared result by the second comparator.

For example, the vehicle proximity notification apparatus may further have a third loudspeaker which outputs warning sound, and the adjusting unit may further adjust sound output from the third loudspeaker so that a third sound collecting signal, which is obtained when the first loudspeaker or the second loudspeaker collects the sound output from the third loudspeaker, coincides with a third reference signal, in a state in which the first loudspeaker or the second loudspeaker functions as a sound collecting element.

Accordingly, the third loudspeaker does not need to function as a microphone, and thus the apparatus is capable of realizing cost reduction.

For example, the first and second loudspeakers may be disposed at a front of the vehicle.

For example, one of the first and second loudspeakers may be disposed at the front of the vehicle, and another may be disposed at a rear of the vehicle.

Moreover, generic or specific aspects of these components may be realized by a system, a method, the integrated circuit, a computer program, a recording medium such as a CD-ROM capable of being read by a computer, or the like, and may be realized by an arbitrary combination of the system, the method, the integrated circuit, the computer program, and a recording medium.

Hereinafter, the exemplary embodiments of the disclosure will be described with reference to drawings. Moreover, each of the exemplary embodiments described hereinafter indicates one specific example of the disclosure. Numeral values, shapes, materials, configuration components, disposing positions and connection shapes of the configuration components, steps, and order of the steps, and the like, indicated by the exemplary embodiments to be described later are examples, and are not intended to limit the disclosure. In addition, among the configuration components in the exemplary embodiments to be described later, the configuration components not disclosed in the independent claim represent the highest concept are described as arbitrary configuration components.

(Exemplary Embodiment)

In the vehicle proximity notification apparatus according to the exemplary embodiment, the plurality of loudspeakers is also used as microphones. Accordingly, the apparatus is capable of realizing cost reduction because a separate microphone does not need to be provided.

Figure 4:
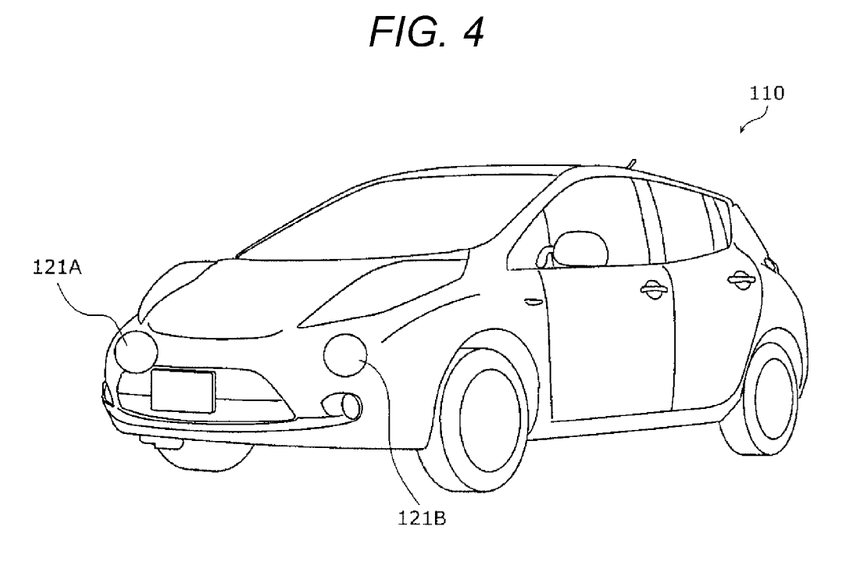
FIG. 4 is a view illustrating an example of a vehicle according to an exemplary embodiment.

First, a configuration of the vehicle proximity notification apparatus according to the exemplary embodiment will be described. FIG. 4 is a view illustrating an exterior of vehicle 110 which is provided with vehicle proximity notification apparatus 120 (refer to FIG. 6) according to the exemplary embodiment.

Figure 5:
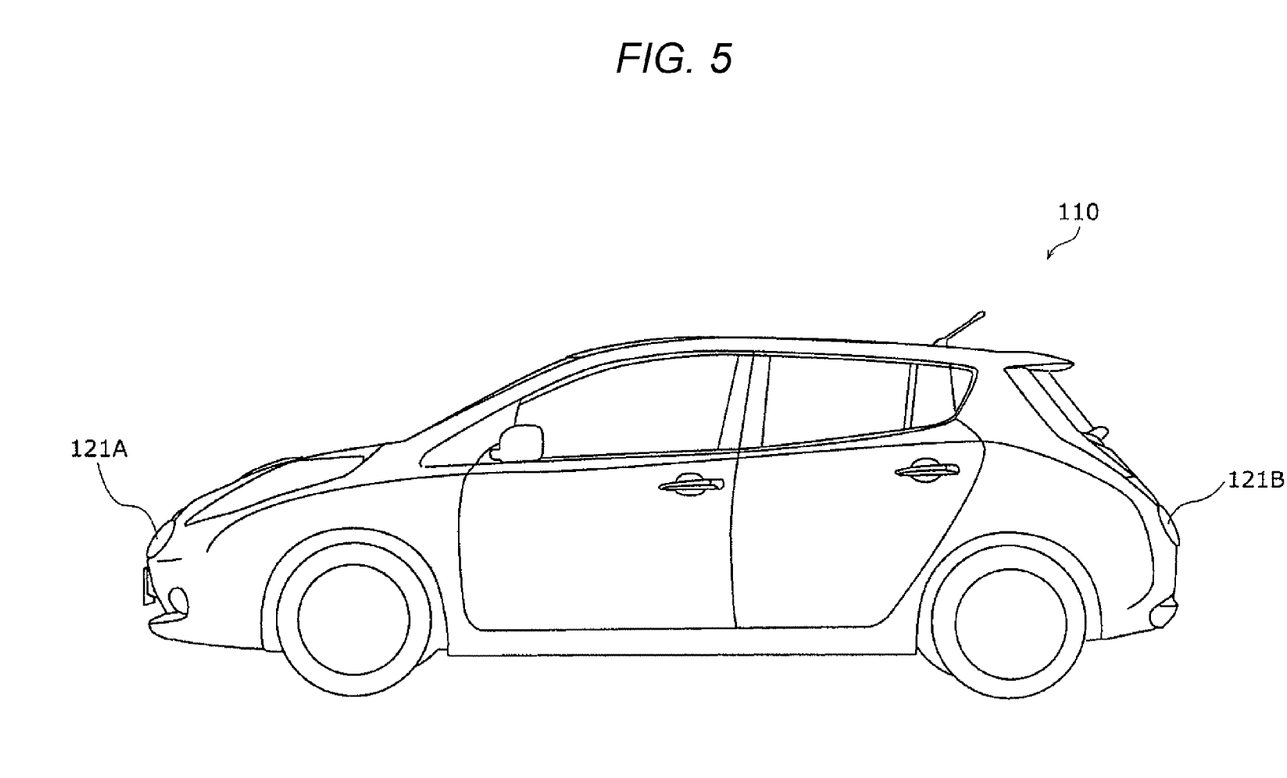
FIG. 5 is a view illustrating another example of the vehicle according to the exemplary embodiment.

As illustrated in FIG. 4, vehicle 110 is provided with two loudspeakers 121A and 121B disposed at a front of vehicle 110. Hereinafter, for the sake of clear description, an example in which two loudspeaker are used will be described, but three or more loudspeakers may be used. In addition, positions where loudspeakers 121A and 121B are disposed are not limited to those of the example illustrated in FIG. 4, and may be disposed at any one of front, side, and rear of vehicle 110. For example, as illustrated in FIG. 5, loudspeaker 121A may be disposed at the front of vehicle 110, and loudspeaker 121B may be disposed at a rear of vehicle 110.

Figure 6:
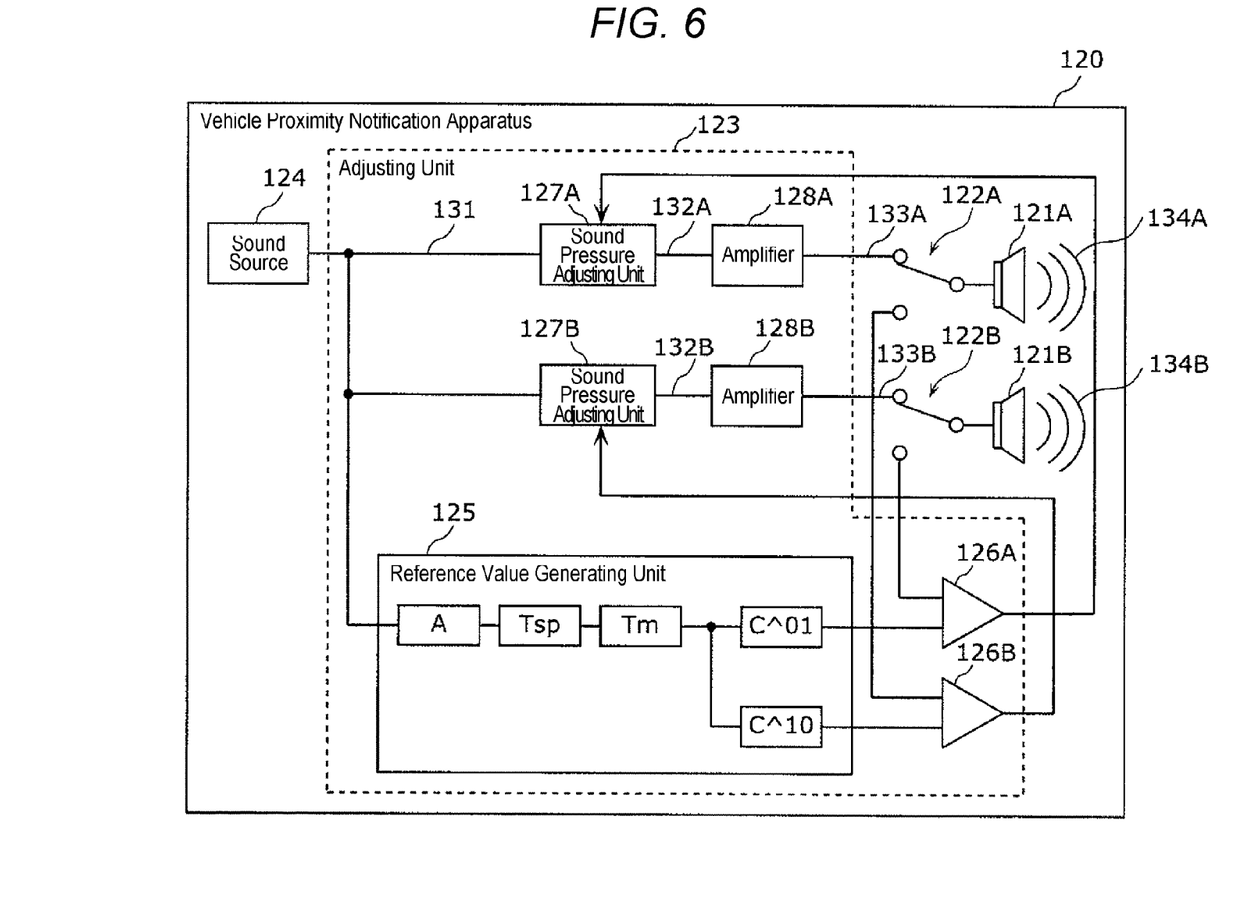
FIG. 6 is a block diagram of a vehicle proximity notification apparatus according to the exemplary embodiment.

FIG. 6 is a block diagram of vehicle proximity notification apparatus 120 according to the exemplary embodiment. Vehicle proximity notification apparatus 120 is mounted to vehicle 110. Vehicle proximity notification apparatus 120 has loudspeakers 121A and 121B, switches 122A and 122B, adjusting unit 123, and sound source 124.

Loudspeaker 121A and loudspeaker 121B respectively output warning sound 134A and warning sound 134B notifying proximity of vehicle 110 to the outside. Here, the warning sound is, for example, engine sound. In addition, since warning sound 134A and warning sound 134B are generated toward pedestrians and the like outside the vehicle, loudspeakers 121A and 121B are provided at the outside of the vehicle.

As generally known, a loudspeaker functions as a sound outputting element (loudspeaker) converting an input electric signal to sound, and functions as a sound collecting element (microphone) converting input sound to an electric signal. Using such characteristics, in the exemplary embodiment, loudspeaker 121A and 121B are used as loudspeakers and microphones, respectively.

Switch 122A switches loudspeaker 121A to function as the sound outputting element (loudspeaker) or as the sound collecting element (microphone). Switch 122B switches loudspeaker 121B to function as the sound outputting element (loudspeaker) or as the sound collecting element (microphone).

Adjusting unit 123 generates signals output to loudspeaker 121A and loudspeaker 121B based on signals output from sound source 124. In addition, adjusting unit 123 has a function of adjusting the sound output from loudspeaker 121A and loudspeaker 121B. Adjusting unit 123 includes reference value generating unit 125, comparators 126A and 126B, sound pressure adjusting units 127A and 127B, and amplifiers 128A and 128B.

First, the normal operation will be described. Normally, loudspeakers 121A and 121B function as the sound outputting elements (loudspeakers), and output warning sound 134A and warning sound 134B, respectively.

Specifically, when vehicle 110 starts to travel, loudspeaker 121A and loudspeaker 121B respectively output warning sound 134A and warning sound 134B which put a travelling state of vehicle 110 in mind of a pedestrian or the like. In addition, the sound pressures and frequencies of warning sound 134A and warning sound 134B are changed according to speed of the vehicle. Accordingly, it is capable of reminding the pedestrian or the like near vehicle 110 of the travelling state of vehicle 110 without giving a strange feeling.

First, sound source 124 outputs original signal 131 in accordance with a travelling state of vehicle 110. Sound pressure adjusting unit 127A adjusts sound pressure of original signal 131 based on an adjustment set value which is set, and thus generates adjusted signal 132A. Amplifier 128A generates output signal 133A based on adjusted signal 132A. Output signal 133A is supplied to loudspeaker 121A through switch 122A, and loudspeaker 121A outputs warning sound 134A.

In the same manner, sound pressure adjusting unit 127B adjusts the sound pressure of original signal 131 based on an adjustment set value which is set, and thus generates adjusted signal 132B. Amplifier 128B generates output signal 133B based on adjusted signal 132B. Output signal 133B is supplied to loudspeaker 121B through switch 122B, and loudspeaker 121B outputs warning sound 134B.

Here, as described above, the warning sound may be changed due to a change of a sound circumference near the loudspeaker, a change of a circumference inside the vehicle, aging deterioration, and the like. To address the situation, in the exemplary embodiment, adjusting unit 123 adjusts warning sound 134A and warning sound 134B respectively output from loudspeaker 121A and loudspeaker 121B. Specifically, the adjustment set values being set in sound pressure adjusting units 127A and 127B are changed.

Hereinafter, the adjustment operation will be described. The adjustment operation to be described later is performed, for example, when an engine of vehicle 110 is started. Moreover, the adjustment operation may be performed when a vehicle inspection is performed by a dealer, or at a maintenance factory, and the like. Otherwise, the adjustment operation may be performed during travelling of vehicle 110.

Figure 7:
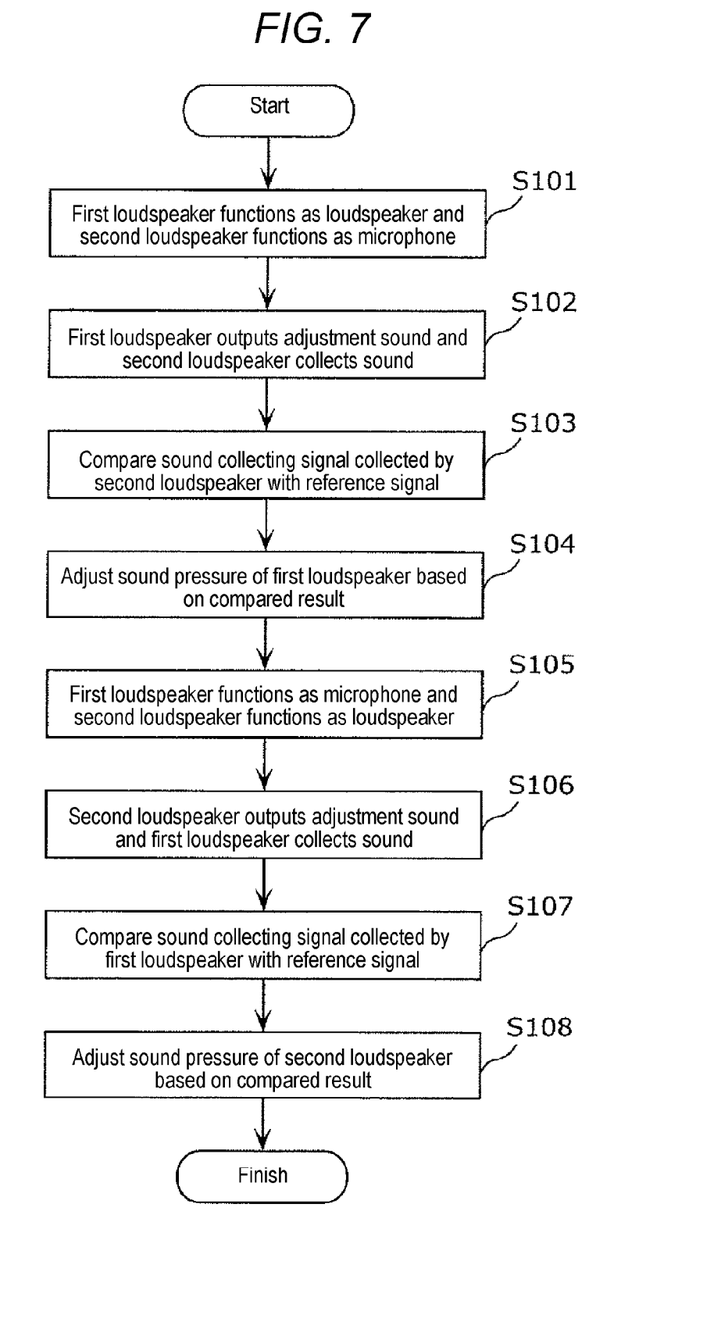
FIG. 7 is a flow chart of an adjustment operation by the vehicle proximity notification apparatus according to the exemplary embodiment.

FIG. 7 is a flow chart of the adjustment operation according to the exemplary embodiment. First, loudspeaker 121A (first loudspeaker) is adjusted in Steps S101 to S104, and subsequently, loudspeaker 121B (second loudspeaker) is adjusted in Step S105 to S108. In addition, FIG. 8 is a diagram for describing an operation of vehicle proximity notification apparatus 120 at the time of adjusting loudspeaker 121A, and FIG. 9 is a diagram illustrating the operation of vehicle proximity notification apparatus 120 at the time of adjusting loudspeaker 121B.

Figure 8:
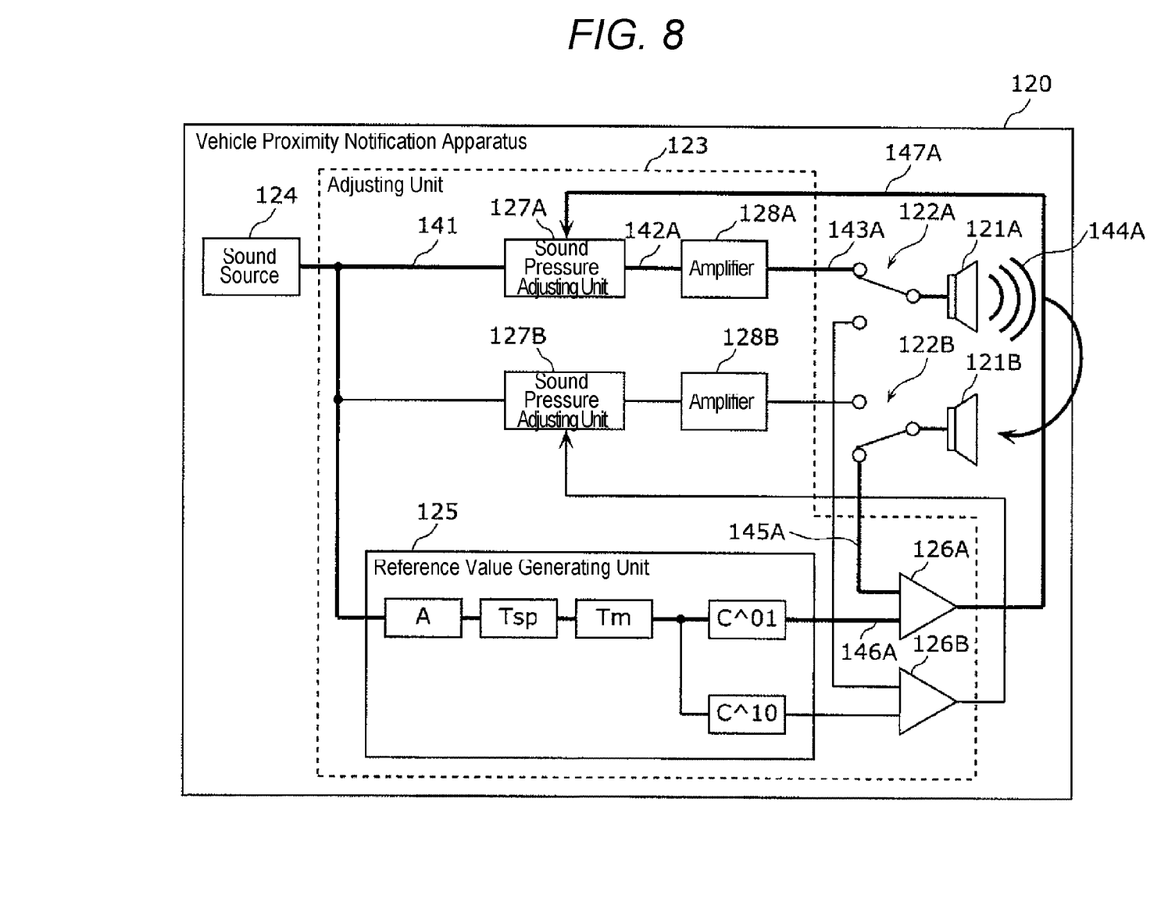
FIG. 8 is a diagram for describing an adjustment operation of a first loudspeaker according to the exemplary embodiment.
Figure 9:
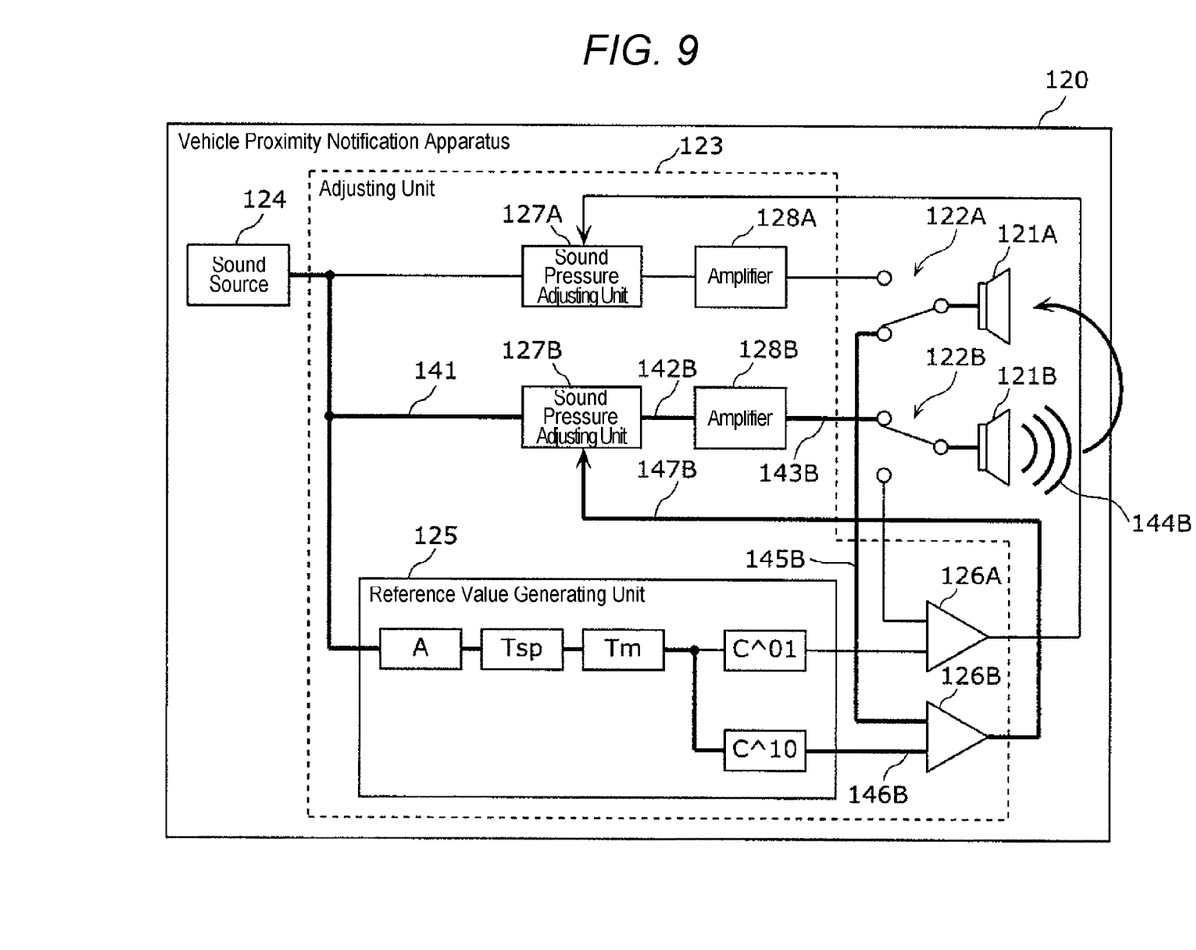
FIG. 9 is a diagram for describing an adjustment operation of a second loudspeaker according to the exemplary embodiment.

First, as illustrated in FIG. 8, a connection relationship is changed, so that switches 122A and 122B switch loudspeaker 121A to function as the sound outputting element (loudspeaker) and loudspeaker 121B to function as the sound collecting element (microphone) (S101).

In this state, sound source 124 outputs original adjustment signal 141. Sound pressure adjusting unit 127A adjusts the sound pressure of original adjustment signal 141 based on a current adjustment set value, and thus generates adjusted signal 142A. Amplifier 128A generates output signal 143A based on adjusted signal 142A. Output signal 143A is supplied to loudspeaker 121A through switch 122A, and loudspeaker 121A outputs adjustment sound 144A. Loudspeaker 121B collects adjustment sound 144A, and thus generates sound collecting signal 145A (S102).

Meanwhile, reference value generating unit 125 generates reference signal 146A indicating a reference value (reference sound pressure) based on original adjustment signal 141. Specifically, reference value generating unit 125 generates reference signal 146A by multiplying original adjustment signal 141 by coefficient A based on a reference amplification factor, coefficient Tsp based on the loudspeaker characteristics, coefficient Tm based on the microphone characteristics, and coefficient C^01 based on transfer characteristics from loudspeaker 121A to loudspeaker 121B. Specifically, coefficient C^01 is an inverse number of transfer function C01 from loudspeaker 121A to loudspeaker 121B. Transfer function C01 is measured in advance, and these coefficients are set by reference value generating unit 125 in advance. Comparator 126A compares sound collecting signal 145A with reference signal 146A, and outputs compared result 147A to sound pressure adjusting unit 127A (S103). For example, compared result 147A is information indicating which one of sound collecting signal 145A and reference signal 146A is greater, or information indicating a difference between sound collecting signal 145A and reference signal 146A.

Sound pressure adjusting unit 127A adjusts the sound pressure of sound output from loudspeaker 121A based on compared result 147A (S104). Specifically, sound pressure adjusting unit 127A changes the adjustment set value so that the difference between sound collecting signal 145A and reference signal 146A is decreased based on compared result 147A. Also, sound pressure adjusting unit 127A change the adjustment set value again so that the difference between sound collecting signal 145A and reference signal 146A is decreased based on compared result 147A of the changed adjustment set value. Sound pressure adjusting unit 127A repeats an updating process of the adjustment set value, until sound collecting signal 145A substantially coincides with reference signal 146A.

Thus, the adjustment operation of loudspeaker 121A is complete.

Next, as illustrated in FIG. 9, the connection relationship is changed so that loudspeaker 121A functions as the sound collecting element (microphone), and loudspeaker 121B functions as the sound outputting element (loudspeaker) (S105) by switches 122A and 122B.

In this state, sound source 124 outputs original adjustment signal 141. Sound pressure adjusting unit 127B adjusts the sound pressure of original adjustment signal 141 based on the current adjustment set value, and thus generates adjusted signal 142B. Amplifier 128B generates output signal 143B based on adjusted signal 142B. Output signal 143B is supplied to loudspeaker 121B through switch 122B, and loudspeaker 121B outputs adjustment sound 144B. Also, loudspeaker 121A collects adjustment sound 144B, and thus generates sound collecting signal 145B (S106).

Meanwhile, reference value generating unit 125 generates reference signal 146B indicating the reference value (reference sound pressure) based on original adjustment signal 141. A specific method is the same as that at the time of adjusting loudspeaker 121A (S103), but coefficient C^10 based on the transfer characteristics from loudspeaker 121B to loudspeaker 121A is used instead of coefficient C^01 based on transfer characteristics from loudspeaker 121A to loudspeaker 121B. Coefficient C^10 is an inverse number of transfer function C10 from loudspeaker 121B to loudspeaker 121A. Comparator 126B compares sound collecting signal 145B with reference signal 146B, and outputs compared result 147B to sound pressure adjusting unit 127B (S107).

Sound pressure adjusting unit 127B adjusts the sound pressure of the sound output from loudspeaker 121B based on compared result 147B (S108). The specific method is the same as that of Step S104.

Thus, the adjustment operation of loudspeaker 121B is complete.

Meanwhile, the above described process may be performed, for example, with respect to respective one of warning sounds having different frequencies, and may be realized by being adjusted once using Fast Fourier Transform (FFT) or the like. In addition, adjustment sounds 144A and 144B may be coincide with warning sound 134A and warning sound 134B, respectively, and may be different from each other.

In the above description, a case where sound pressure adjusting units 127A and 127B adjust the respective sound pressures is described as an example, but the frequencies may be adjusted in addition to the sound pressures.

As described above, vehicle proximity notification apparatus 120 according to the exemplary embodiment is placed in vehicle 110, and has loudspeakers 121A and 121B which respectively output warning sound 134A and warning sound 134B notifying approaching of vehicle 110 to the outside. Apparatus 120 also has switch 122A which switches loudspeaker 121A to function as a sound outputting element converting an electric signal to sound or as a sound collecting element which converts sound to an electric signal, and switch 122B which switches loudspeaker 121B to function as a sound outputting element or as a sound collecting element. Apparatus 120 further has adjusting unit 123. (1) In a state in which loudspeaker 121A functions as the sound outputting element and loudspeaker 121B functions as the sound collecting element, adjusting unit 123 adjusts sound output from loudspeaker 121A so that sound collecting signal 145A coincides with reference signal 146A. Sound collecting signal 145A is obtained when the sound output from loudspeaker 121A is collected by loudspeaker 121B. Further, (2) in a state in which loudspeaker 121B functions as the sound outputting element and loudspeaker 121A functions as the sound collecting element, adjusting unit 123 adjusts the sound output from loudspeaker 121B, so that sound collecting signal 145B coincides with reference signal 146B. Sound collecting signal 145B is obtained when the sound output from loudspeaker 121B is collected by loudspeaker 121A.

In addition, adjusting unit 123 includes comparator 126A and sound pressure adjusting unit 127A. Comparator 126A compares the sound pressure of sound collecting signal 145A with the reference sound pressure indicated by reference signal 146A, and sound pressure adjusting unit 127A adjusts the sound pressure of the sound output from loudspeaker 121A so that the sound pressure of sound collecting signal 145A coincides with the reference sound pressure indicated by reference signal 146A, based on compared result 147A by comparator 126A. Adjusting unit 123 further includes comparator 126B and sound pressure adjusting unit 127B. Comparator 126B compares the sound pressure of sound collecting signal 145B with the reference sound pressure indicated by reference signal 146B, and sound pressure adjusting unit 127B adjusts the sound pressure of the sound output from loudspeaker 121B so that the sound pressure of sound collecting signal 145B coincides with the reference sound pressure indicated by reference signal 146B, based on compared result 147B by comparator 126B.

Accordingly, loudspeaker 121A and loudspeaker 121B are also used as microphones, thus a separate microphone does not need to be provided. Therefore, vehicle proximity notification apparatus 120 is capable of realizing cost reduction.

Figure 10:
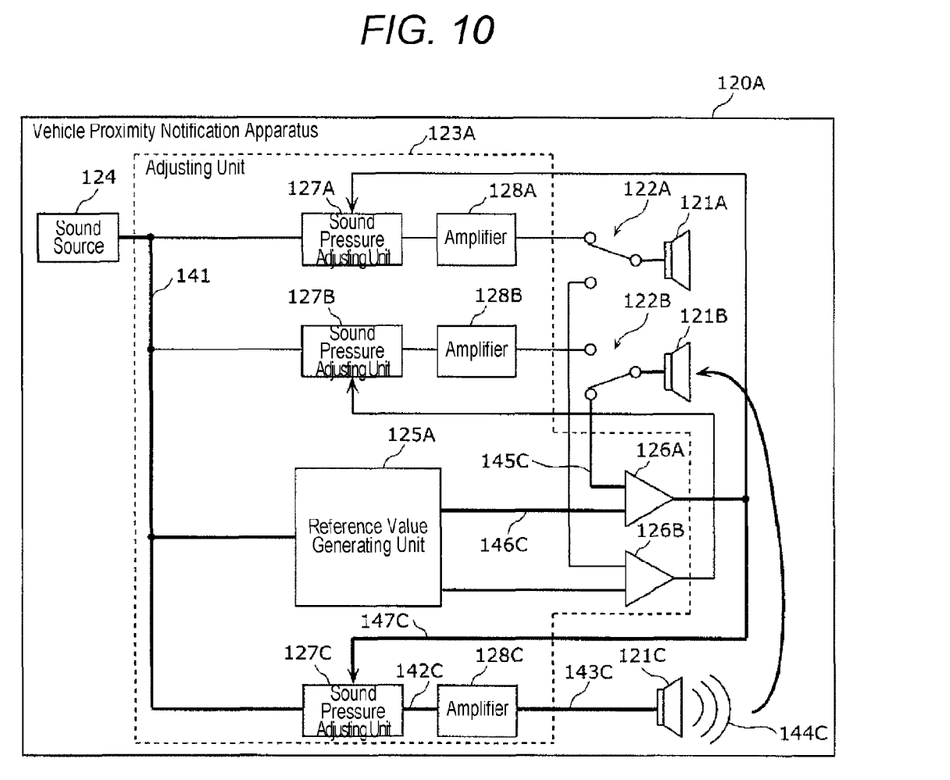
FIG. 10 is a block diagram of a vehicle proximity notification apparatus according to a modification example of the exemplary embodiment.

The number of the loudspeakers may be three or more. In this case, the loudspeakers used as the microphones may be two or more. FIG. 10 is a block diagram of vehicle proximity notification apparatus 120A having three loudspeakers. Vehicle proximity notification apparatus 120A illustrated in FIG. 10 has sound pressure adjusting unit 127C, amplifier 128C, and loudspeaker 121C, in addition to a configuration of vehicle proximity notification apparatus 120 illustrated in FIG. 5. In addition, the functions of adjusting unit 123A and reference value generating unit 125A are different from those of adjusting unit 123 and reference value generating unit 125. FIG. 10 illustrates a state at the time of adjusting loudspeaker 121C.

Loudspeaker 121C outputs warning sound in the same manner as loudspeakers 121A and 121B at the time of being normally operated.

At the time of adjusting loudspeaker 121C, as illustrated in FIG. 10, the connection relationship is changed so that switch 122B switches loudspeaker 121B to function as the sound collecting element (microphone).

In this state, sound source 124 outputs original adjustment signal 141. Sound pressure adjusting unit 127C adjusts the sound pressure of original adjustment signal 141, and thus generates adjusted signal 142C, based on the current adjustment set value. Amplifier 128C generates the output signal 143C based on adjusted signal 142C. Output signal 143C is supplied to loudspeaker 121C, and loudspeaker 121C outputs adjustment sound 144C. When loudspeaker 121B collects adjustment sound 144C, sound collecting signal 145C is generated.

Meanwhile, reference value generating unit 125A generates reference signal 146C indicating the reference value (reference sound pressure) based on original adjustment signal 141. The specific method thereof is the same as the method at the time of adjusting loudspeaker 121A, but coefficient C^21 transfer characteristics from loudspeaker 121C to loudspeaker 121B is used instead of coefficient C^01 based on transfer characteristics from loudspeaker 121A to loudspeaker 121B. Coefficient C^21 is the inverse number of transfer function C21 from loudspeaker 121C to loudspeaker 121B. Comparator 126A compares sound collecting signal 145C with reference signal 146C, and outputs compared result 147C to sound pressure adjusting unit 127C.

Sound pressure adjusting unit 127C adjusts the sound pressure of the sound output from loudspeaker 121C based on compared result 147C.

Note that a case where loudspeaker 121B is used as the sound collecting element at the time of adjusting loudspeaker 121C is described as an example; however, loudspeaker 121A may be used as the sound collecting element.

As described above, in a state in which loudspeaker 121A or 121B functions as a sound collecting element, adjusting unit 123A adjusts the sound output from loudspeaker 121C so that sound collecting signal 145C coincides with reference signal 146C. Sound collecting signal 145C is obtained when loudspeaker 121A or 121B collects the sound output from loudspeaker 121C.

Accordingly, since loudspeaker 121C does not need to function as the microphone, cost reduction can be realized.

Hitherto, various vehicle proximity notification apparatuses according to the exemplary embodiment is described; however, the disclosure is not limited to the exemplary embodiment.

At least a part of processing units included in the vehicle proximity notification apparatuses according to the exemplary embodiment may be realized as LSI which is an integrated circuit. The part(s) may be individual one chip, and a part or all of them may be integrated as one chip.

In addition, the part is not limited to the LSI which becomes an integrated circuit, and may be realized by a dedicated circuit or a general purpose processor. A field programmable gate array (FPGA) which can be programmed after the LSI is manufactured, or a reconfigurable processor in which connection or setting of circuit cells inside the LSI can be reconfigured may be used.

That is, in the above description, each of the configuration components is configured with a dedicate hardware, but may be realized by executing a software program suitable for each of the configuration components. Each of the configuration components may be realized when a program executing unit such as a central processing unit (CPU) or a processor reads and executes a software program recorded in a recording medium such as a hard disk, a semiconductor memory, and the like.

In addition, all the numbers used above are exemplified for describing the disclosure in detail, and the disclosure is not limited to the exemplified numbers.

In addition, division of functional blocks in the block diagrams is an example, and a plurality of the functional blocks may be realized as one functional block, one functional block may be divided into a plurality of functional blocks, or a part of the function may be moved to another functional block. In addition, functions of a plurality of functional blocks having similar functions may be processed in parallel or in time division by a single hardware or software.

In addition, an order of executing a plurality of steps illustrated in the flow charts described above is exemplified in order to described the disclosure in detail, and another order other than the order may be applied thereto. In addition, a part of the above steps may be executed simultaneously (in parallel) with the other steps.

Hitherto, the vehicle proximity notification apparatus according to one or a plurality of aspects of the exemplary embodiment is described; however, the disclosure is not limited to the exemplary embodiment. An exemplary embodiment made by embodying various modifications found by the skilled in the art and an exemplary embodiment made by combining configuration components in other exemplary embodiments may be also included in a range of one or a plurality of aspects, as long as the exemplary embodiments are not departed from the spirit of the disclosure.

The disclosure can be applied to the vehicle proximity notification apparatus equipped in low noise vehicles such as electric vehicles and hybrid vehicles.

What is claimed is:

1. A vehicle proximity notification apparatus being placed in a vehicle, the vehicle proximity notification apparatus comprising:
   a first loudspeaker and a second loudspeaker that output warning sound which notifies proximity of the vehicle to an outside;
   a first switch that switches the first loudspeaker to function as a sound outputting element which converts an electric signal to sound, or to function as a sound collecting element which converts sound to an electric signal;
   a second switch that switches the second loudspeaker to function as a sound outputting element or to function as a sound collecting element; and
   an adjusting unit that
   (1) adjusts the sound output from the first loudspeaker so that a first sound collecting signal, which is obtained when the second loudspeaker collects the sound output from the first loudspeaker, coincides with a first reference signal, in a state in which the first loudspeaker functions as the sound outputting element and the second loudspeaker functions as the sound collecting element, and
   (2) adjusts the sound output from the second loudspeaker so that a second sound collecting signal, which is obtained when the first loudspeaker collects the sound output from the second loudspeaker, coincides with a second reference signal, in a state in which the second loudspeaker functions as the sound outputting element and the first loudspeaker functions as the sound collecting element.

2. The vehicle proximity notification apparatus according to claim 1,
wherein the adjusting unit includes:
a first comparator which compares a sound pressure of the first sound collecting signal with a first reference sound pressure indicated by the first reference signal,
a first sound pressure adjusting unit which adjusts a sound pressure of the sound output from the first loudspeaker so that the sound pressure of the first sound collecting signal coincides with the first reference sound pressure, based on a compared result by the first comparator,
a second comparator which compares a sound pressure of the second sound collecting signal with a second reference sound pressure indicated by the second reference signal, and
a second sound pressure adjusting unit which adjusts a sound pressure of the sound output from the second loudspeaker so that the sound pressure of the second sound collecting signal coincides with the second reference sound pressure, based on a compared result by the second comparator.

3. The vehicle proximity notification apparatus according to claim 1, further comprising:
a third loudspeaker that outputs warning sound,
wherein the adjusting unit further adjusts sound output from the third loudspeaker so that a third sound collecting signal, which is obtained when the first loudspeaker or the second loudspeaker collects the sound output from the third loudspeaker, coincides with a third reference signal, in a state in which the first loudspeaker or the second loudspeaker functions as the sound collecting element.

4. The vehicle proximity notification apparatus according to claim 1,
wherein the first loudspeaker and the second loudspeaker are disposed at a front of the vehicle.

5. The vehicle proximity notification apparatus according to claim 1,
wherein one of the first loudspeaker and the second loudspeaker is disposed at a front of the vehicle, and another is disposed at a rear of the vehicle.

* * * * *